United States Patent
Feng et al.

(10) Patent No.: US 7,733,670 B2
(45) Date of Patent: Jun. 8, 2010

(54) BIDIRECTIONAL ACTIVE POWER CONDITIONER WITH DC/AC INVERTER IN LOW-FREQUENCY SWITCHING

(75) Inventors: Ya-Tsung Feng, Kaohsiung (TW); Chin-Chang Wu, Kaohsiung (TW); Hung-Liang Chou, Kaohsiung (TW)

(73) Assignee: Ablerex Electronics Co., Ltd., Hsintien (TW)

( * ) Notice: Subject to any disclaimer, the term of this patent is extended or adjusted under 35 U.S.C. 154(b) by 406 days.

(21) Appl. No.: 11/760,828

(22) Filed: Jun. 11, 2007

(65) Prior Publication Data

US 2008/0062724 A1     Mar. 13, 2008

(30) Foreign Application Priority Data

Sep. 12, 2006   (TW) .............................. 95133631 A

(51) Int. Cl.
*H02M 3/335*     (2006.01)

(52) U.S. Cl. .............................. 363/17; 363/26; 363/37; 363/97; 363/98

(58) Field of Classification Search .................... 363/17, 363/24, 25, 26, 37, 97, 98
See application file for complete search history.

(56) References Cited

U.S. PATENT DOCUMENTS

| | | | |
|---|---|---|---|
| 4,024,451 A * | 5/1977 | Nishino et al. ................. | 363/25 |
| 5,625,539 A | 4/1997 | Nakata | |
| 6,094,363 A | 7/2000 | Cheng | |
| 6,330,170 B1 * | 12/2001 | Wang et al. .................... | 363/37 |
| 6,914,418 B2 | 7/2005 | Sung | |
| 2001/0048605 A1 | 12/2001 | Kurokami | |

* cited by examiner

*Primary Examiner*—Jeffrey L Sterrett
(74) *Attorney, Agent, or Firm*—Alan Kamrath; Kamrath & Associates PA

(57) ABSTRACT

A bidirectional active power conditioner includes a DC side, a bidirectional DC/DC power converter, a DC/AC inverter and an AC side. The DC side electrically connects with a DC source while the AC side electrically connects with a load and an AC source. The bidirectional DC/DC power converter is controlled via high-frequency pulse width modulation (PWM) switching so as to generate a predetermined DC voltage or DC current while the DC/AC inverter is controlled to convert the predetermined DC voltage or DC current into a predetermined AC voltage or AC current.

18 Claims, 5 Drawing Sheets

BIDIRECTIONAL ACTIVE POWER CONDITIONER WITH DC/AC INVERTER IN LOW-FREQUENCY SWITCHING

BACKGROUND OF THE INVENTION

1. Field of the Invention

The present invention relates to a bidirectional active power conditioner. Particularly, the present invention relates to the bidirectional active power conditioner including a bidirectional DC/DC power converter and a DC/AC inverter connected thereto. More particularly, the present invention relates to the bidirectional active power conditioner using a high-frequency pulse-width-modulation (PWM) switching and controlling the bidirectional DC/DC power converter to generate a predetermined DC voltage or DC current and further using a low-frequency DC/AC inverter to convert the DC voltage or DC current into a predetermined AC voltage or AC current, so as to enhance the power quality and to improve the power characteristics of AC loads.

2. Description of the Related Art

Generally, active power conditioners are widely used to enhance the power quality and to improve the power characteristics of AC loads, For example, a conventional active power conditioner has a DC side to connect with a battery unit so as to construct an off-line Uninterruptible Power Supply (UPS). When the utility power is normal, utility power can pass through a bypass switch including in the active power conditioner for directly supplying to a load. In addition to this, the utility power can charge the battery unit included in the off-line UPS at the same time. When the utility power is abnormal or fails, a DC power of the battery unit of the off-line UPS is converted into AC power and is supplied to the predetermined load. Accordingly, no power failure will affect the operation of the load.

However, the conventional off-line UPS usually supplies an output voltage with a square wave which may affect or damage some loads such as transformers. When the off-line UPS supplying a square wave output voltage connects with a power-supply load having the function of power factor correction, the square wave output voltage might result in the over-current-protection operation of the off-line UPS.

In view of this, several off line UPS apparatuses are designed to supply a sinusoidal wave to the output voltage. U.S. Pat. No. 5,625,539, entitled "Method and Apparatus for Controlling a DC to AC Inverter System by a Plurality of Pulse Width Modulation Train", discloses an off-line UPS apparatus which allows directly supplying a utility power to a load when the utility power is normal. Conversely, when the utility power is abnormal, the off line UPS apparatus is actuated to control a unidirectional DC/DC power converter with high-frequency PWM switching to convert a low DC voltage of a battery unit into a relatively high DC voltage which is charged into a high-capacitance DC capacitor. A full-bridge DC/AC inverter is utilized to convert the relatively high DC voltage of the high-capacitance DC capacitor into a high-quality AC voltage to supply to the load. A battery charger is further utilized to charge the battery unit when the utility power is normal. Accordingly, a control circuit applied in such a structure of the UPS is sophisticated. In addition to this, the two-stage power converters with high-frequency PWM switching can result in a low efficiency. However, there is a need for providing the high-capacitance DC capacitor to act as an energy buffer between two-stage power converters. Disadvantageously, this results in an increase of manufacturing cost.

Another off-line UPS is disclosed in U.S. Pat. No. 6,094,363, entitled "Uninterruptible Power Supply with Sine Wave Output and Energy Recycle Function". The off-line UPS allows directly supplying utility power to a load when the utility power is normal. Conversely, when the utility power is abnormal or fails, the off line UPS is actuated to control a unidirectional DC/DC power converter to boost a low DC voltage of a battery unit into a full-wave rectified sinusoidal voltage. A low-frequency DC/AC inverter is utilized to convert the full-wave rectified sinusoidal voltage into a sinusoidal voltage to supply to the load. An energy recovery battery charger is further utilized. The battery charger with the function of energy recovery is operated to charge the battery unit when the utility power is normal or is operated to recover the redundant energy in the power conversion process to the battery unit when the utility power is abnormal. In this case, there is no need for providing a high-capacitance DC capacitor to act as an energy buffer between two-stage power converters, and only one converter is operated in high-frequency switching. Although such an off line UPS is successful in simplifying the entire structure and increasing the efficiency, an additional battery charger with the function of energy recovery is necessarily provided for charging the battery unit and recovering the redundant power in the power conversion process.

In another case, the DC side of the conventional active power conditioner connects with a solar cell unit or other renewable energy source so the active power conditioner acts as a power conversion interface of the solar cell unit or other renewable energy source for supplying AC power in a distribution power system or an AC load. The conventional power conversion interface includes two-stage power converters (i.e. DC/DC power converter and DC/AC inverter).

For example, U.S. Patent No. 6,914,418, entitled "Multi-Mode Renewable Power Converter System", discloses a DC/DC power converter with high-frequency PWM switching utilized to convert a low DC voltage generated from a solar cell unit to be a relatively high DC voltage to which a high-capacitance DC capacitor is charged. A DC/AC inverter with high-frequency PWM switching is utilized to convert the relatively high DC voltage of the high-capacitance DC capacitor into high-quality AC power to supply to a load or to inject into a distribution power system. However, two-stage power converters acting as a power conversion interface for the solar cell unit must be operated in high-frequency PWM switching which can result in a low efficiency. In addition to this, such a structure of the bidirectional active power conditioner is sophisticated due to the fact that a high-capacitance DC capacitor acts as an energy buffer between the two-stage power converters. Disadvantageously, this results in an increase of manufacturing cost.

As is described in greater detail below, the present invention discloses a bidirectional active power conditioner which includes a bidirectional DC/DC power converter and a DC/AC inverter. The bidirectional DC/DC power converter is controlled via high-frequency PWM switching so as to generate a predetermined DC voltage or DC current while the DC/AC inverter is controlled in low frequency switching to convert the predetermined DC voltage or DC current into a predetermined AC voltage or AC current. Accordingly, only one power converter is operated in high-frequency switching so as to increase the efficiency of the bidirectional active power conditioner in such a way as to mitigate and overcome the above problem. Advantageously, the bidirectional active power conditioner is successful in reducing manufacturing cost, simplifying the control circuit and increasing the efficiency.

SUMMARY OF THE INVENTION

The primary objective of this invention is to provide a bidirectional active power conditioner. A bidirectional DC/DC power converter is controlled via high-frequency PWM switching so as to generate a predetermined DC voltage or DC current while a DC/AC inverter is controlled in low frequency switching to convert the predetermined DC voltage or DC current into a predetermined AC voltage or AC current. There is no need for providing a high-capacitance DC capacitor to act as an energy buffer between two-stage power converters. Accordingly, only one power converter is operated at the high-frequency switching operation so as to decrease the switching loss and increase the power efficiency. Consequently, the bidirectional active power conditioner can be designed in reducing manufacturing cost, simplifying the control circuit and increasing the power efficiency.

The bidirectional active power conditioner in accordance with an aspect of the present invention includes a DC side, a bidirectional DC/DC power converter, a DC/AC inverter and an AC side. The DC side electrically connects with a DC source, while the AC side electrically connects with a load and/or an AC source. The bidirectional DC/DC power converter is controlled via high-frequency PWM switching so as to generate a predetermined DC voltage or DC current while the DC/AC inverter is controlled in low switching frequency to convert the predetermined DC voltage or DC current into a predetermined AC voltage or AC current.

In a separate aspect of the present invention, the bidirectional. DC/DC power converter includes four power electronic switches, a high-frequency isolation transformer and an inductor.

In a further separate aspect of the present invention, the bidirectional DC/DC power converter includes four power electronic switches, two equivalent capacitors, a high-frequency isolation transformer and an inductor.

In yet a further separate aspect of the present invention, the bidirectional DC/DC power converter includes six power electronic switches, a high-frequency isolation transformer and an inductor.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
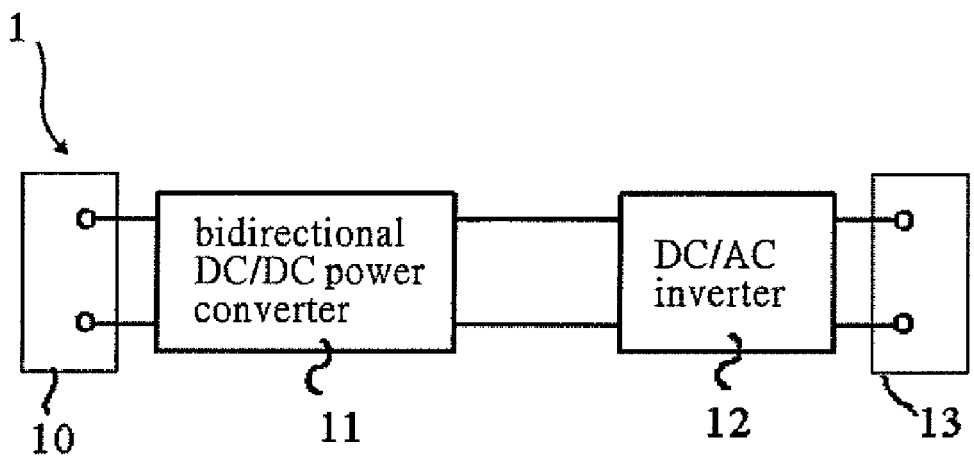
FIG. 1 is a schematic circuitry illustrating a bidirectional active power conditioner in accordance with a first embodiment of the present invention.

Turning now to FIG. 1, a schematic circuitry of a bidirectional active power conditioner in accordance with a first embodiment of the present invention is illustrated. The bidirectional active power conditioner 1 includes a DC side 10, a bidirectional DC/DC power converter 11, a DC/AC inverter 12 and an AC side 13.

Figure 2:
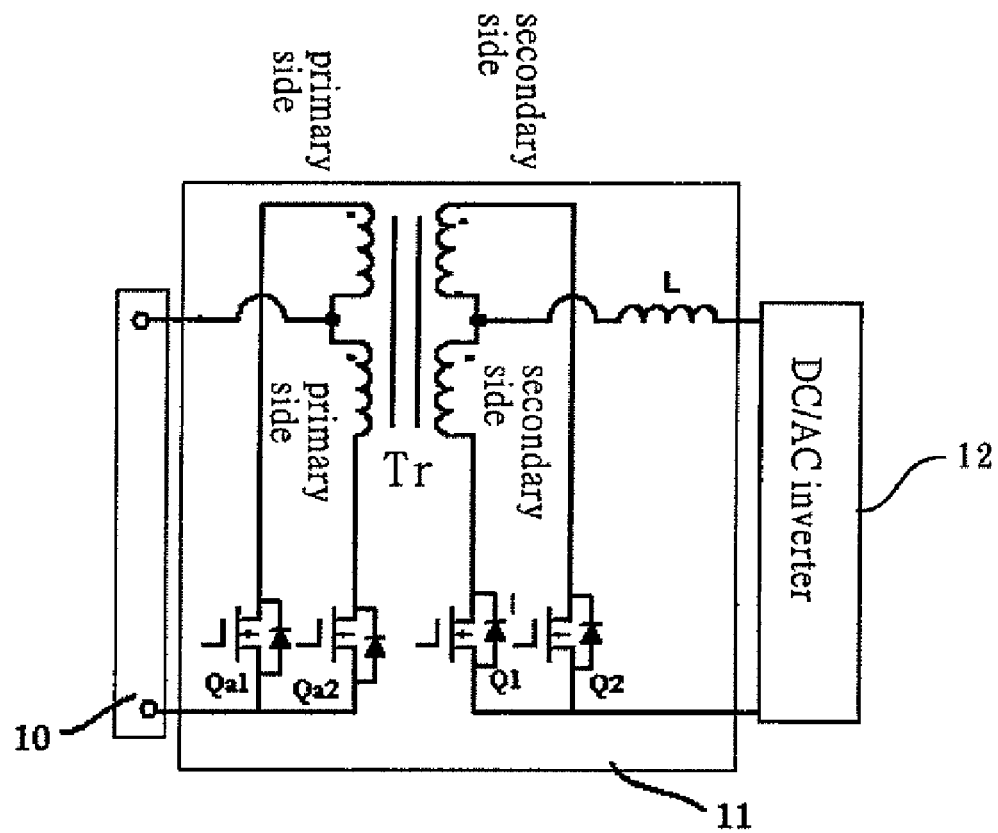
FIG. 2 is a schematic circuitry illustrating a bidirectional DC/DC power converter of the bidirectional active power conditioner in accordance with the first embodiment of the present invention, depicted in FIG. 1.

Turning now to FIG. 2, a schematic circuitry of the bidirectional DC/DC power converter of the bidirectional active power conditioner in accordance with the first embodiment of the present invention is illustrated. In the first embodiment, the bidirectional DC/DC power converter 11 includes four power electronic switches Qa1, Qa2, Q1, Q2, a high-frequency isolation transformer Tr and an inductor L. Each of the power electronic switches Qa1, Qa2, Q1, Q2 consists of a power switch element and a diode which are connected in an anti-parallel relationship. The power electronic switches Qa1, Qa2 are located at a primary side of the high-frequency isolation transformer Tr, while the power electronic switches Q1, Q2 are located at a secondary side thereof. The primary side of the high-frequency isolation transformer Tr configures a push-pull configuration which is further connected with the DC side 10 of the bidirectional active power conditioner 1. When the bidirectional DC/DC power converter 11 is operated for bidirectional power flow, the power electronic switches Qa1, Qa2, Q1, Q2 are controlled via high-frequency PWM switching. In a switching operation, the power electronic switches Qa1, Q1 are complementary1 while the power electronic switches Qa2, Q2 are complementary. Preferably, the power electronic switches Qa1 and Qa2 have a duty cycle less than 0.5 in the switching operation and a phase difference of 180 degrees therebetween. When the bidirectional DC/DC power converter 11 is operated to transmit power from the secondary side to the primary side of the high-frequency isolation transformer Tr, the power electronic switches Qa1 and Qa2 are completely disabled, and the power electronic switches Q1 and Q2 are controlled via high-frequency PWM switching. In this manner, the high-frequency isolation transformer Tr still allows transmitting power through the diodes of the disabled power electronic switches Qa1 and Qa2. Consequently, the bidirectional DC/DC power converter 11 is operated as a current-fed push-pull DC/DC power converter.

Figure 3:
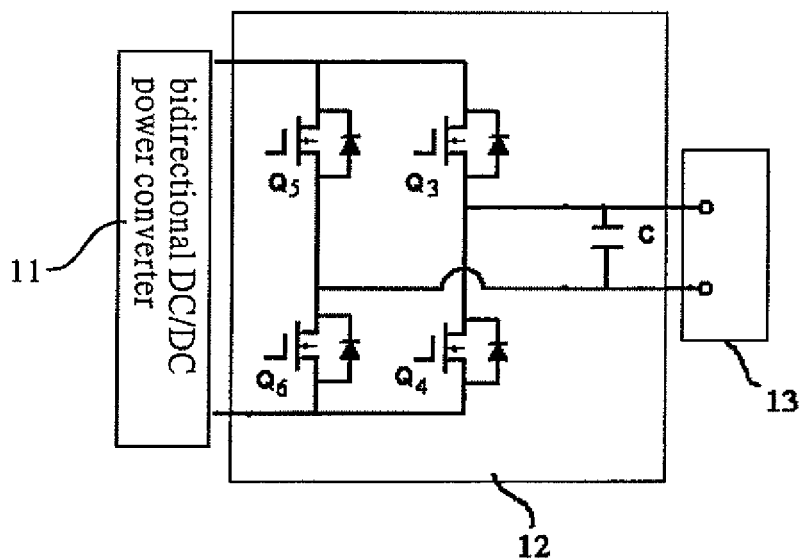
FIG. 3 is a schematic circuitry illustrating a DC/AC inverter of the bidirectional active power conditioner in accordance with the first embodiment of the present invention, depicted in FIG. 1.

Turning now to FIG. 3, a schematic circuitry of the DC/AC inverter of the bidirectional active power conditioner in accordance with the first embodiment of the present invention is illustrated. In the first embodiment, the DC/AC inverter 12 includes four power electronic switches Q3, Q4, Q5, Q6 and a filter capacitor C. Each of the power electronic switches Q3, Q4, Q5, Q6 consists of a power switch element and a diode which are connected in an anti-parallel relationship. During transmitting power from the AC side 13 to the DC side 10 of the bidirectional active power conditioner 1, all of the power electronic switches Q3, Q4, Q5, Q6 are completely disabled so that the four diodes of the power electronic switches Q3, Q4, Q5, Q6 are operated as a rectifier. In the bidirectional power flow, the power electronic switches Q3, Q4, Q5, Q6 are controlled via low-frequency square wave switching (about 50 Hz or 60 Hz). In the switching operation, the power electronic switches Q3, Q6 are synchronously switched on or off, while the other power electronic switches Q4, Q5 are synchronously switched on or off. Furthermore, the power electronic switches Q3, Q4 forming a first arm of the DC/AC inverter 12 and the power electronic switches Q5, Q6 forming a second arm of the DC/AC inverter 12 are complementary in the switching operation.

Figure 4:
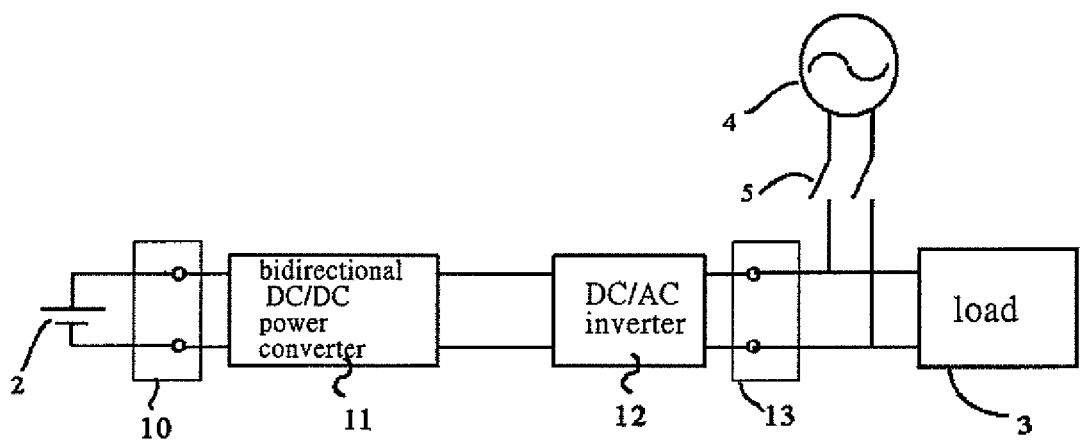
FIG. 4 is a schematic circuitry illustrating the bidirectional active power conditioner in accordance with the first embodiment of the present invention which is applied in a UPS system having a function of power factor correction.

Turning now to FIG. 4, a schematic circuitry of the bidirectional active power conditioner, applied in a UPS system, in accordance with the first embodiment of the present invention is illustrated. The DC side 10 of the bidirectional active power conditioner 1 electrically connects with a battery unit 2, while the AC side 13 of the bidirectional active power conditioner 1 electrically connects with a load 3 in parallel. Additionally, an AC source 4 electrically connects with the AC side 13 of the bidirectional active power conditioner 1 via a switch 5.

With continued reference to FIG. 4, when the AC source 4 is normal, the switch 5 is closed, and the AC source 4 supplies power to the load 3. At the same time, the AC source 4 can charge the battery unit 2 via the bidirectional active power conditioner 1 by transmitting power from the AC side 13 to the DC side 10. Preferably, the bidirectional active power conditioner 1 is designed to have a function of power factor correction which can correct a current injecting into the bidirectional active power conditioner 1 to have a sinusoidal wave and whose phase is approximately identical with the phase of the voltage of the AC source 4 so as to obtain an unity power factor at the AC side 13.

Referring again to FIGS. 3 and 4, when the AC source 4 is normal, the bidirectional active power conditioner 1 allows transmitting the power from the AC side 13 to the DC side 10 for charging the battery unit 2. In the DC/AC inverter 12, all of the power electronic switches Q3, Q4, Q5, Q6 are completely disabled, and the diodes provided in the power electronic switches Q3, Q4, Q5, Q6 can operate the DC/AC inverter 12 as a rectifier.

Referring again to FIGS. 2 and 4, when the AC source 4 is normal and the power is transmitted from the AC side 13 to the DC side 10 of the bidirectional active power conditioner 1, the bidirectional DC/DC power converter 11 only allows transmitting power from the secondary side to the primary side of the high-frequency isolation transformer Tr. In this way, the two power electronic switches Q1, Q2 located at the secondary side of the high-frequency isolation transformer Tr are controlled via high-frequency PWM switching, and the two power electronic switches Qa1, Qa2 located at the primary side of the high-frequency isolation transformer Tr are completely disabled. Consequently, the bidirectional DC/DC power converter 11 is operated as a current-fed push-pull DC/DC power converter. By controlling the power electronic switches Q1, Q2 located at the secondary side of the high-frequency isolation transformer Tr, a current passing through the inductor L of the bidirectional DC/DC power converter 11 can be controlled to have a full-wave rectified sinusoidal waveform whose amplitude is controllable. After the DC/AC inverter 12 commutates, the current of the AC side 13 approximately becomes a sinusoidal wave whose phase is approximately identical with the phase of voltage of the AC source 4. Accordingly, the input power factor of the bidirectional active power conditioner 1 is approximately unity. In addition, controlling the amplitude of the inductor's current of the DC/DC power converter 11 can adjust the amount of charging power for the battery unit 2.

Referring again to FIGS. 2 through 4, when the AC source 4 is abnormal or fails, the switch 5 is opened. The bidirectional active power conditioner 1 can convert the power stored in the battery unit 2 into a high-quality AC power to supply to the load 3. It will be understood that the power flow of the bidirectional active power conditioner 1 is bidirectional. In this circumstance, the four power electronic switches Qa1, Qa2, Q1, Q2 of the bidirectional DC/DC power converter 11 are controlled via high-frequency PWM switching, as has been previously discussed in greater detail above. By controlling the switching operation of the power electronic switches Qa1, Qa2, Q1, Q2, the bidirectional active power conditioner 1 can generate a full-wave rectified sinusoidal voltage. In consideration of the bidirectional power flow, the four power electronic switches Q3, Q4, Q5, Q6 of the DC/AC inverter 12 are controlled in low-frequency square-wave switching. In this circumstance, the four power electronic switches Q3, Q4, Q5, Q6 of the DC/AC inverter 12 are preferably controlled by a low-frequency square wave. Preferably, the frequency of the square wave is approximately equal to that of the AC source 4. In this manner, the DC/AC inverter 12 can commutate the full-wave rectified sinusoidal voltage transmitted from the bidirectional DC/DC power converter 11 into a sinusoidal AC voltage which is supplied to the load 3 via the AC side 13 of the bidirectional active power conditioner 1.

Figure 5A:
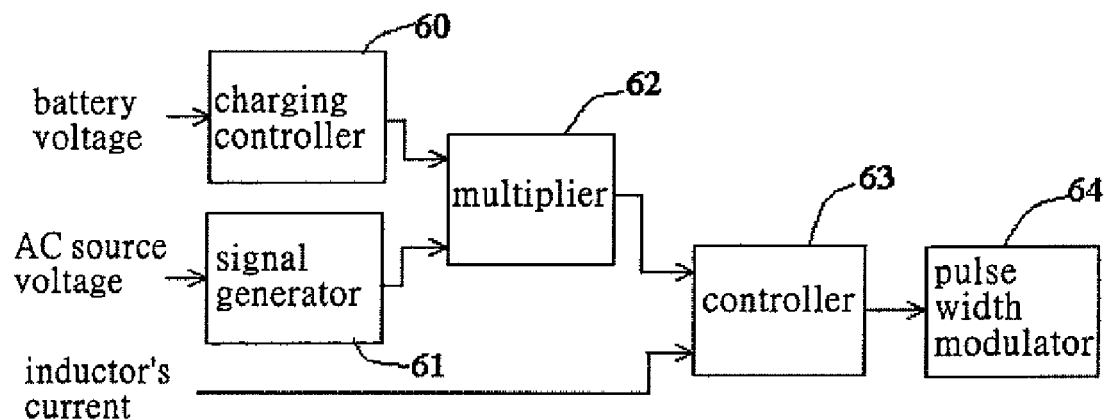
FIG. 5(a) is a control block diagram illustrating the bidirectional DC/DC power converter of the bidirectional active power conditioner, applied in the UPS system having a function of power factor correction depicted in FIG. 4, in accordance with the first embodiment of the present invention while an AC source is normal.

Turning now to FIG. 5(a), a control block diagram of the bidirectional DC/DC power converter 11 of the bidirectional active power conditioner 1 applied in a UPS system with the function of power factor correction, when the AC source 4 is normal, in accordance with the first embodiment of the present invention is illustrated. When the AC source 4 is normal, the power is transmitted from the AC side 13 to the DC side 10 of the bidirectional active power conditioner 1 to charge the battery unit 2. The current at the AC side 13 is desired to be approximately a sinusoidal wave whose phase is approximately identical with the phase of voltage of the AC source 4. Consequently, the inductor's current of the bidirectional DC/DC power converter 11 must be controlled to be a full-wave rectified sinusoidal wave. By referring to FIGS. 4 and 5(a), when the AC source 4 is normal, a controller of the bidirectional DC/DC power converter 11 detects the voltage of the battery unit 2 and, then, sends the detected voltage to a charging controller 60. The voltage of the AC source 4 is detected, and the detected voltage is sent to a signal generator 61 so as to generate a full-wave rectified sinusoidal signal with unity amplitude. The full-wave rectified sinusoidal signal has a frequency equal to twice as high as that supplied from the AC source 4, and a zero point of the full-wave rectified sinusoidal signal is identical with that of the voltage of the AC source 4. The output of the charging conroller 60 and the rectified sinusoidal signal are sent to a multiplier 62. The product of the multiplier 62 is a reference signal. The inductor's current of the bidirectional DC/DC power converter 11 is further detected. The detected inductor's current and the reference signal are sent to a controller 63 to output a signal which is further sent to a pulse width modulator 64 to generate control signals for controlling the two power electronic switches Q1, Q2 of the bidirectional DC/DC power converter 11.

Figure 5B:
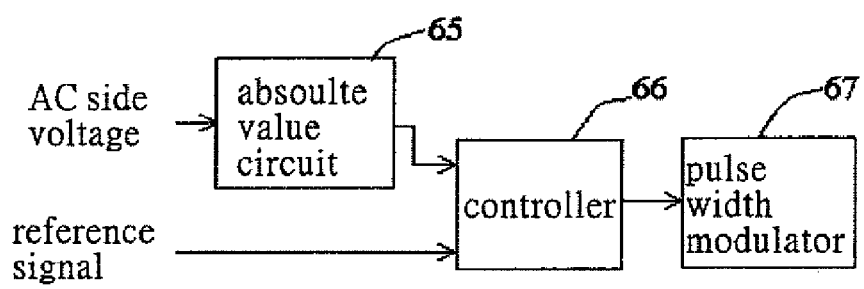
FIG. 5(b) is a control block diagram illustrating the bidirectional DC/DC power converter of the bidirectional active power conditioner, applied in the UPS system having a function of power factor correction depicted in FIG. 4, in accordance with the first embodiment of the present invention while an AC source is abnormal or fails.

Turning now to FIG. 5(b), a control block diagram of the bidirectional DC/DC power converter 11 of the bidirectional active power conditioner 1 applied in a UPS system with the function of power factor correction, when the AC source 4 is abnormal or fails, in accordance with the first embodiment of the present invention is illustrated. In this circumstance, the bidirectional active power conditioner 1 must convert the power stored in the battery unit 2 into a high-quality AC power to supply to the load 3. The voltage of AC side 13 is desired to be a sinusoidal wave. Consequently, the output voltage of the bidirectional DC/DC power converter 11 must be controlled to be a full-wave rectified sinusoidal wave. By referring to FIGS. 4 and 5(b), when the AC source 4 is abnormal or fails, the controller of the bidirectional DC/DC power converter 11 detects the voltage across the AC side 13 and, then, sends the detected voltage of the AC side 13 to an absolute value circuit 65. The output of the absolute value circuit 65 and a reference signal are sent to a controller 66. The reference signal is a full-wave rectified sinusoidal signal. The output of the controller 66 is further sent to a pulse width modulator 67 to generate control signals for controlling the four power electronic switches Qa1, Qa2, Q1, Q2 of the bidirectional DC/DC power convener 11.

Referring back to FIGS. 2 through 4, the bidirectional active power conditioner 1 of the present invention can be applied in a UPS system with a function of active power filter by a control method different from that for the UPS system with a function of power factor correction. With reference to FIG. 4, when the AC source 4 is normal, the AC source 4 can supply the power to the load 3 via the switch 5 and charge the battery unit 2 through the bidirectional active power conditioner 1. However, the bidirectional active power conditioner 1 of the present invention has a function of an active power filter for filtering harmonics and reactive power generated from the load 3. Accordingly, a current supplied from the AC source 4 is approximately a sinusoidal wave whose phase is identical with that of the voltage of the AC source 4 so as to obtain a unity power factor from the AC source 4. When the bidirectional active power conditioner 1 is operated as an active power filter, the bidirectional active power conditioner 1 allows bidirectional power flow between the DC side 10 and the AC side 13. Accordingly, the four power electronic switches Q3, Q4, Q5, Q6 of the DC/AC inverter 12 are controlled by a low-frequency square wave. Preferably, the frequency of the square wave is equal to that of the voltage of the AC source 4. Correspondingly, the power electronic switches Qa1, Qa2, Q1, Q2 of the bidirectional DC/DC power converter 11 are controlled via high-frequency PWM switching, as has been previously described in the description of the first embodiment which is incorporated herein by reference. Controlling the power electronic switches Qa1, Qa2, Q1, Q2 can actuate the bidirectional DC/DC power converter 11 to generate a full-wave rectified waveform of compensation current. The compensation current includes a fundamental real component, a fundamental reactive component and a harmonic component. The phase and frequency of the fundamental real component are equal to that of the voltage of the AC source 4 so as to charge a real power to the battery unit 2. The fundamental reactive component and the harmonic component are approximately equal to the fundamental reactive component and the harmonic component generating from the load 3 for compensating reactive power and harmonic current thereof. The DC/AC inverter 12 can convert a full-wave rectified waveform of compensation current into an AC compensation current which is supplied from the AC side 13. The AC compensation current is injected into the AC source 4 so that a current supplied from the AC source 4 is approximately a sinusoidal wave whose phase is identical with that of the voltage of the AC source 4 so as to obtain a unity power factor from the AC source 4. When the AC source 4 is abnormal or fails, the operations of the power electronic switches Qa1, Qa2, Q1, Q2 of the bidirectional DC/DC power converter 11 are previously described in the description of the first embodiment which is incorporated herein by reference.

Figure 6:
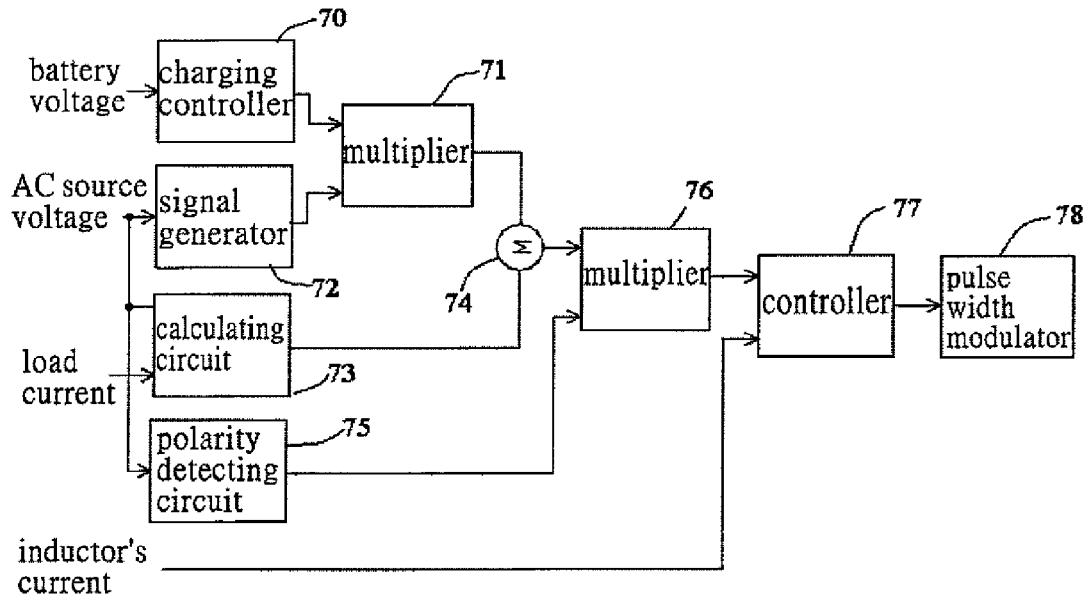
FIG. 6 is a control block diagram illustrating the bidirectional DC/DC power converter of the bidirectional active power conditioner, applied in a UPS system having a function of active power filter depicted in FIG. 4, in accordance with the first embodiment of the present invention while an AC source is abnormal or fails.

Turning now to FIG. 6, a control block diagram of the bidirectional DC/DC power converter 11 of the bidirectional active power conditioner 1, applied in the UPS system with the function of active power filter, in accordance with the first embodiment of the present invention is illustrated. A detected voltage of the battery unit 2 is sent to a charging controller 70. A detected voltage of the AC source 4 is sent to a signal generator 72 so as to generate a sinusoidal signal with unity amplitude and to be in phase with the voltage of the AC source 4. Subsequently, outputs of the charging controller 70 and the signal generator 72 are sent to a multiplier 71 and are multiplied therein. A detected current of the load 3 and the detected voltage of the AC source 4 are sent to a calculating circuit 73 whose output is the summation of harmonic and fundamental reactive components of the current of the load 3. Subsequently, outputs of the multiplier 71 and the calculating circuit 73 are sent to an adder 74 so as to generate a reference signal of compensation current. A detected voltage of the AC source 4 is sent to a polarity detecting circuit 75 so as to generate a positive/negative unit signal (i.e. ±1). Subsequently, outputs of the adder 74 and the polarity detecting circuit 75 arc sent to a multiplier 76 and are multiplied therein. An output of the multiplier 76 and a detected current of the inductor L of the bidirectional DC/DC power converter 11 are sent to a controller 77. Finally, an output of the controller 77 is sent to a pulse width modulator 78 so as to generate control signals for controlling the power electronic switches Qa1, Qa2, Q1, Q2 of the bidirectional DC/DC power converter 11.

Referring back to FIG. 2 through 4, in comparing with the conventional active power conditioner operating as the off-line UPS which requires providing a high-capacitance DC capacitor to act as an energy buffer between two-stage power converters or an additional battery charger, the bidirectional active power conditioner 1 of the present invention merely requires controlling only one stage of the power converter via high-frequency switching operation. Advantageously, the bidirectional active power conditioner 1 of the present invention can be designed to omit either of an additional high-capacitance DC capacitor acting as an energy buffer between two-stage power converters or an additional battery charger. Consequently, the bidirectional active power conditioner of The present invention is successful in reducing manufacturing cost, simplifying the control circuit and increasing the power efficiency.

Figure 7:
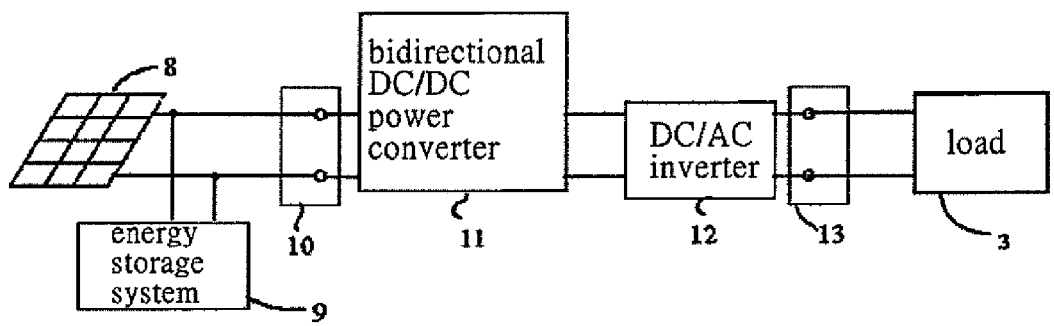
FIG. 7 is a schematic circuitry illustrating the bidirectional active power conditioner in accordance with the first embodiment of the present invention applied in a solar power system.

Turning now to FIG. 7, a schematic view of the bidirectional active power conditioner in accordance with a first embodiment of the present invention applied in a solar power system is illustrated. The first embodiment of the present invention applied in a solar power system has identical numerals of the first embodiment of the present invention applied in a UPS system, as shown in FIG. 4. In comparison with the first embodiment of the present invention applied in a UPS system shown in FIG. 4, the DC side 10 of the bidirectional active power conditioner applied in the solar power system connects to a DC source which includes a solar cell unit 8 and an energy storage system 9 which are connected in parallel. The energy storage system 9 includes a battery unit and a battery charger. The AC side 13 of the bidirectional active power conditioner 1 connects with the load 3 for supplying AC power. The bidirectional active power conditioner 1 applied in the solar power system is used to convert a DC voltage generated from the solar cell unit 8 or the energy storage system 9 into an AC voltage for supplying to the load 3. The operations of the power electronic switches Qa1, Qa2, Q1, Q2 of the bidirectional DC/DC power converter 11 are previously described in the description of the first embodiment of the present invention applied in a UPS system, while the AC source 4 is abnormal, which is incorporated herein by reference.

Referring back to FIGS. 2, 3 and 7, The bidirectional active power conditioner 1 of the present invention applied in The solar power system merely requires controlling only one stage of the power converters which is operated in high-frequency switching. Advantageously, the bidirectional active power conditioner 1 of The present invention can be designed to omit an additional high-capacitance DC capacitor acting as an energy buffer between two-stage power converters. Consequently, the bidirectional active power conditioner 1 of the present invention applied in the solar power system is successful in reducing manufacturing cost, simplifying the control circuit and increasing the power efficiency.

Figure 8:
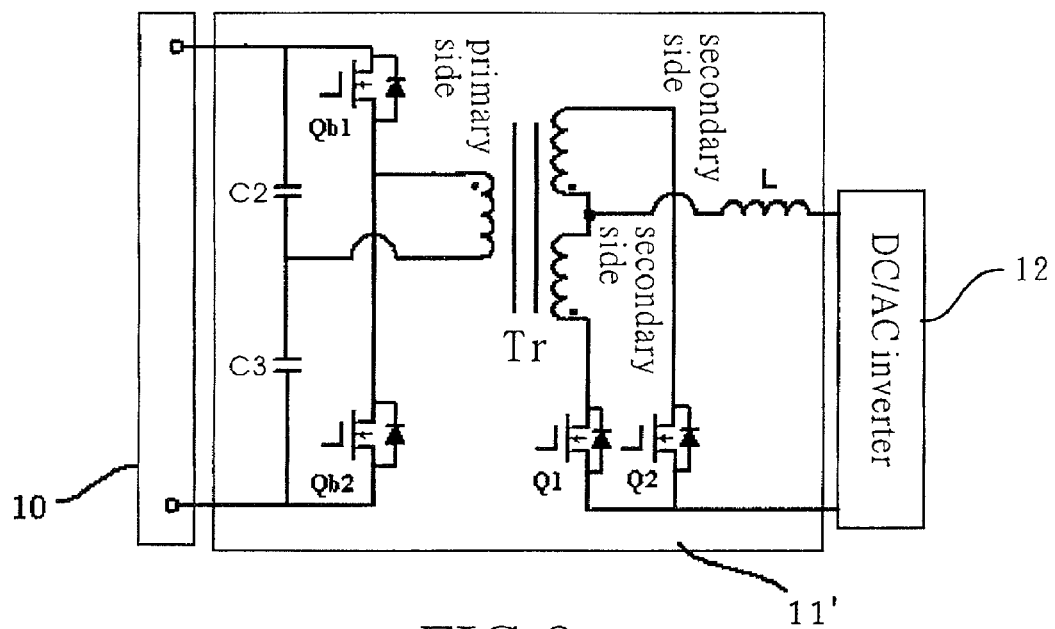
FIG. 8 is a schematic circuitry illustrating the bidirectional DC/DC power converter of the bidirectional active power conditioner in accordance with the second embodiment of the present invention.

Turning now to FIG. 8, a schematic view of the bidirectional active power conditioner in accordance with a second embodiment of the present invention is illustrated. Reference numerals of the second embodiment of the present invention have applied the identical numerals of the first embodiment, as shown in FIG. 2. As indicated in FIG. 8, the bidirectional DC/DC power converter 11' of the second embodiment has a circuitry construction different from that of the first embodiment. In the second embodiment, the bidirectional DC/DC power converter 11'includes four power electronic switches Qb1, Qb2, Q1, Q2, two equivalent capacitors C2, C3, a high-frequency isolation transformer Tr and an inductor L. Each of the power electronic switches Qb1, Qb2, Q1, Q2 consists of a power switch element and a diode which are connected in an anti-parallel relationship. The two power electronic switches Qb1, Qb2 and the two capacitors C2, C3 are located at the primary side of the high-frequency isolation transformer Tr and are connected to configure a half bridge structure, while the two power electronic switches Q1, Q2 are located at the secondary side thereof. When the DC/DC power converter 11' is operated for bidirectional power flow, the power electronic switches Qa1, Qa2, Q1, Q2 are controlled via high-frequency PWM switching. In a switching operation, the two power electronic switches Qb1, Q1 are complementary, while the two power electronic switches Qb2, Q2 are complementary. Preferably, the power electronic switches Qb1 and Qb2 have a duty cycle less than 0.5 in the switching operation and a phase difference of 180 degrees therebetween. When the DC/DC power converter 11' is operated for the unidirectional power flow from the secondary side to the primary side of the high-frequency isolation transformer Tr, the two power electronic switches Qb1 and Qb2 are completely disabled, and the other two power electronic switches Q1 and Q2 are controlled via high-frequency PWM switching. In this manner, the high-frequency isolation transformer Tr still allows transmitting power through the diodes of the disabled power electronic switches Qb1 and Qb2. Consequently, the bidirectional DC/DC power converter 11' is operated as a current-fed push-pull DC/DC power converter.

Figure 9:
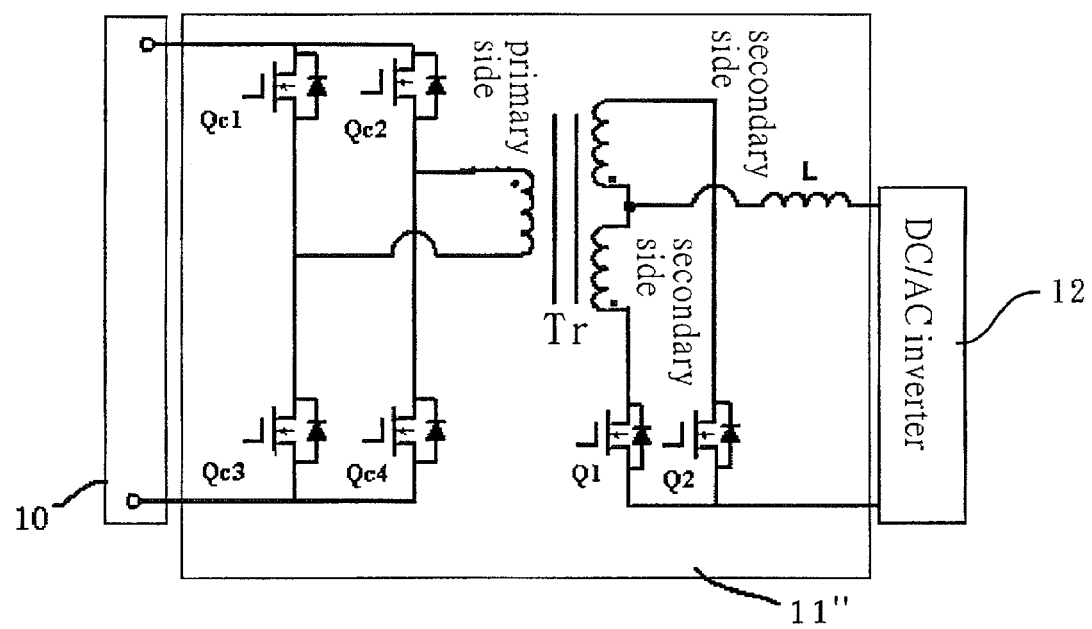
FIG. 9 is a schematic circuitry illustrating a bidirectional DC/DC power converter of the bidirectional active power conditioner in accordance with a third embodiment of the present invention.

Turning now to FIG. 9, a schematic circuitry of a bidirectional active power conditioner in accordance with a third embodiment of the present invention is illustrated. Reference numerals of the third embodiment of The present invention have applied the identical numerals of the first embodiment, as shown in FIG. 2. As indicated in FIG. 9, the bidirectional DC/DC power converter 11" of the Third embodiment has a circuitry construction different from that of the first embodiment. In the third embodiment, the bidirectional DC/DC power converter 11" includes six power electronic switches Qc1, Qc2, Qc3, Qc4, Q1, Q2, a high-frequency isolation transformer Tr and an inductor L. Each of the power electronic switches Qc1, Qe2, Qc3, Qc4, Q1, Q2 consists of a power switch element and a diode which are connected in an anti-parallel relationship. The four power electronic switches Qc1, Qc2, Qc3, Qc4 are located at the primary side of the high-frequency isolation transformer Tr to configure a full-bridge structure, while the two power electronic switches Q1, Q2 are located at the secondary side thereof. When the DC/DC power converter 11" is operated for bidirectional power flow, the power electronic switches Qc1, Qc2, Qc3, Qc4, Q1, Q2 are controlled via high-frequency PWM switching. In a switching operation, the two power electronic switches Qc1, Qc4 are synchronous, and each of the power electronic switches Qc1, Qc4 and The power electronic switch Q1 are complementary. Correspondingly, the two power electronic switches Qc2, Qc3 are synchronous, and each of the power electronic switches Qc2, Qc3 and the power electronic switch Q2 are complementary. Preferably, the power electronic switches Qc1 and Qc2 have a duty cycle less than 0.5 in the switching operation and a phase difference of 180 degrees therebetween. When The DC/DC power converter 11" is operated for the unidirectional power flow from the secondary side to the primary side of the high-frequency isolation transformer Tr, The four power electronic switches Qc1, Qc2, Qc3, Qc4 are completely disabled, and the other two power electronic switches Q1 and Q2 are controlled via high-frequency PWM switching. In this manner, the high-frequency isolation transformer Tr still allows transmitting power through the diodes of the disabled power electronic switches Qc1, Qc2, Qc3, Qc4. Consequently, the bidirectional DC/DC power converter 11" is operated as a current-fed push-pull DC/DC power converter.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A bidirectional active power conditioner, comprising:
    a DC side connected to a DC source;
    a bidirectional DC/DC power converter having a high-frequency isolation transformer with a primary side and a secondary side, with each of the primary and secondary sides having a plurality of power electronic switches respectively, with the primary side connecting to the DC side and the power electronic switches being disabled or controlled via high-frequency PWM switching;

a DC/AC inverter having four power electronic switches and connecting with the secondary side of the bidirectional DC/DC power converter, with said power electronic switches of the DC/AC inverter being disabled or controlled via low frequency switching;

an AC side connected with the DC/AC inverter, said AC side further connected with one or both of a load and an AC source; and a filter capacitor having two points directly connecting with two connecting points of the power electronic switches of the DC/AC inverter, wherein each connecting point forms a point where two power electronic switches of the DC/AC inverter connects in series, wherein an output current of the power electronic switches of the secondary side of the bidirectional DC/DC power converter equals an input current of the power electronic switches of the DC/AC inverter;

wherein when power is transmitted from the AC side to the DC side, the power electronic switches of the DC/AC inverter are all disabled to act as a rectifier, the power electronic switches at the primary side are all disabled, and the power electronic switches at the secondary side are controlled via high-frequency PWM switching;

wherein in a bidirectional power flow, the power electronic switches of the DC/AC inverter are all controlled via low frequency switching, and the power electronic switches of the bidirectional DC/DC power converter are all controlled via high-frequency PWM switching, with the bidirectional DC/DC power converter generating a predetermined DC voltage or a predetermined DC current and the DC/AC inverter converting the predetermined DC voltage or the predetermined DC current into a predetermined AC voltage or a predetermined AC current when power is transmitted from the DC side to the AC side.

2. The bidirectional active power conditioner as defined in claim 1, wherein the DC source is a battery unit.

3. The bidirectional active power conditioner as defined in claim 1, wherein the DC source is a solar cell unit and an energy storage system connected in parallel.

4. The bidirectional active power conditioner as defined in claim 1, wherein each of the plurality of power electronic switches of the bidirectional DC/DC power converter includes a power switch element and a diode connected in an anti-parallel relationship.

5. The bidirectional active power conditioner as defined in claim 1, wherein the bidirectional DC/DC power convener includes an inductor serially connected between the secondary side of the high-frequency isolation transformer and the DC/AC inverter.

6. The bidirectional active power conditioner as defined in claim 5, wherein two of the power electronic switches and two equivalent capacitors are located at the primary side of the high-frequency isolation transformer to configure a half-bridge structure which is further connected to the DC side.

7. The bidirectional active power conditioner as defined in claim 5, wherein two of the power electronic switches are located at the secondary side of the high-frequency isolation transformer to configure a push-pull structure which is further connected with the DC/AC inverter via the inductor.

8. The bidirectional active power conditioner as defined in claim 5, wherein the AC source electrically connects with the AC side via a switch for supplying power to the load; with the AC source used to charge the DC source via the bidirectional active power conditioner, with the power electronic switches of the bidirectional DC/DC power converter being controlled to generate a current passing through the inductor to have a full-wave rectified sinusoidal waveform, with the DC/AC inverter commutating the full-wave rectified sinusoidal current to be a sinusoidal current inputted from the AC side, with a phase of the inputted current being approximately equal to that of the voltage supplied from the AC power source so as to obtain an unity power factor in the AC side of the bidirectional active power conditioner.

9. The bidirectional active power conditioner as defined in claim 8, wherein when power is transmitted from the AC side to the DC side, the bidirectional DC/DC power converter is controlled by the following circuit: a first controller detecting a voltage of the DC source and sending the detected voltage to a charging controller, a signal generator receiving a detected voltage of the AC source to generate a full-wave rectified sinusoidal signal with unity amplitude, with the full-wave rectified sinusoidal signal having a frequency equal to twice as high as a frequency of the voltage supplied from the AC source, and a zero point of the full-wave rectified sinusoidal signal identical to a zero point of the voltage of the AC source, a multiplier receiving an output of the charging controller and the rectified sinusoidal signal to form a reference signal, a second controller receiving the reference signal and a detected current of the inductor of the bidirectional DC/DC power converter, and the second controller outputting a signal to a pulse width modulator to generate control signals for controlling the power electronic switches at the secondary side of the high-frequency isolation transformer;

wherein in the bidirectional power flow, the bidirectional DC/DC power converter is controlled by the following circuit: the first controller detecting a voltage across the AC side and sending the detected voltage to an absolute value circuit, a third controller receiving an output of the absolute value circuit and a full-wave rectified sinusoidal signal, the pulse width modulator receiving an output of the third controller to generate control signals for controlling the power electronic switches of the bidirectional DC/DC power converter.

10. The bidirectional active power conditioner as defined in claim 5, wherein the AC source electrically connects with the AC side via a switch for supplying power to the load and supplying the power to the DC source via the bidirectional active power conditioner, the bidirectional active power conditioner being further functioned as an active power filter, controlling power electronic switches of the bidirectional DC/DC power converter to generate a full-wave rectified waveform of the compensation current, the DC/AC inverter commutating the full-wave rectified waveform of the compensation current to generate an AC compensation current which is injected into the AC source so that a current supplied from the AC source is sinusoidal and in phase with the voltage of AC source so as to obtain an unity power factor from the AC source.

11. The bidirectional active power conditioner as defined in claim 10, wherein the bidirectional DC/DC power converter is controlled by the following circuit: a charging controller receiving a detected voltage of the DC source, a signal generator receiving a detected voltage of the AC source to generate a sinusoidal signal with unity amplitude and in a phase identical to a phase of the voltage of the AC source, a first multiplier receiving outputs of the charging controller and the signal generator, a calculating circuit receiving a detected current of the load and the detected voltage of the AC source to output a summation of harmonic and fundamental reactive components of the current of the load, an adder receiving outputs of the first multiplier and the calculating circuit to generate a reference signal of compensation current, a polarity detecting circuit receiving the detected voltage of the AC source to generate a positive/negative unit signal, a second multiplier receiving outputs of the adder and the polarity detecting circuit, a controller receiving an output of the second multiplier and a detected current of the inductor of the bidirectional DC/DC power converter, and a pulse width modulator receiving an output of the controller to generate control signals for controlling the power electronic switches of the bidirectional DC/DC power converter.

12. The bidirectional active power conditioner as defined in claim 1, wherein, in the bidirectional power flow, all of the power electronic switches of the bidirectional Dc/DC power converter are controlled via high-frequency PWM switching, and in a switching operation, the power electronic switches located at the primary side and the power electronic switches located at the secondary side are complementary.

13. The bidirectional active power conditioner as defined in claim 1, wherein two of the power electronic switches are located at the primary side of the high-frequency isolation transformer to configure a push-pull structure which is further connected with the DC side.

14. The bidirectional active power conditioner as defined in claim 1, wherein each of the plurality of power electronic switches of the DC/AC inverter includes a power switch element and a diode connected to be anti-parallel.

15. The bidirectional active power conditioner as defined in claim 1, wherein the power electronic switches of the DC/AC inverter configure a full bridge structure.

16. The bidirectional active power conditioner as defined in claim 1, wherein four of the power electronic switches are located at the primary side of the high-frequency isolation transformer to configure a full-bridge structure which is further connected to the DC side.

17. The bidirectional active power conditioner as defined in claim 1, wherein, in the bidirectional power flow, the power electronic switches of the DC/AC inverter are controlled by a low-frequency square-wave, with a frequency of the low-frequency square wave equal to a frequency of a voltage of the AC source.

18. The bidirectional active power conditioner as defined in claim 1, wherein when the AC side is only connected to the load or the AC source connected to the AC side is abnormal or fails, the power electronic switches of the bidirectional DC/DC power converter are controlled to generate a full-wave rectified sinusoidal waveform of voltage and the DC/AC inverter commutates the full-wave rectified sinusoidal waveform of voltage into a sinusoidal waveform of AC voltage to supply to the load.

* * * * *